United States Patent
Steiner et al.

(10) Patent No.: US 9,230,589 B2
(45) Date of Patent: Jan. 5, 2016

(54) METHOD FOR PRODUCING BI-POLAR COMPLEMENTARY STRUCTURE PATTERNS

(71) Applicant: Seagate Technology LLC, Cupertino, CA (US)

(72) Inventors: Philip Steiner, Los Altos, CA (US); René J. M. van de Veerdonk, Pleasanton, CA (US)

(73) Assignee: Seagate Technology LLC, Cupertino, CA (US)

( * ) Notice: Subject to any disclaimer, the term of this patent is extended or adjusted under 35 U.S.C. 154(b) by 140 days.

(21) Appl. No.: 14/199,882

(22) Filed: Mar. 6, 2014

(65) Prior Publication Data

US 2014/0266524 A1 Sep. 18, 2014

Related U.S. Application Data

(60) Provisional application No. 61/778,334, filed on Mar. 12, 2013.

(51) Int. Cl.
  *G11B 5/855* (2006.01)
  *H01F 7/02* (2006.01)
  *H01F 41/02* (2006.01)
  *G11B 5/74* (2006.01)
  *G11B 5/596* (2006.01)

(52) U.S. Cl.
  CPC ............ *G11B 5/855* (2013.01); *G11B 5/59688* (2013.01); *G11B 5/743* (2013.01); *H01F 7/02* (2013.01); *H01F 41/0253* (2013.01); *G11B 5/59655* (2013.01)

(58) Field of Classification Search
  CPC ...... G11B 5/012; G11B 5/5565; G11B 5/743; G11B 5/865; G11B 5/59688; G11B 5/59627; G11B 5/855; G11B 5/746; G11B 5/59655; H01F 7/02; H01F 41/0253; B82Y 10/00
  USPC ............... 360/48, 49, 17, 77.05, 77.06, 77.08
  See application file for complete search history.

(56) References Cited

U.S. PATENT DOCUMENTS

| | | | |
|---|---|---|---|
| 7,771,852 B2 | 8/2010 | Albrecht et al. | |
| 7,986,488 B2 | 7/2011 | Coker et al. | |
| 8,623,223 B2 * | 1/2014 | Dobisz | B82Y 30/00 216/11 |
| 8,654,471 B2 | 2/2014 | Springberg et al. | |
| 8,737,002 B1 * | 5/2014 | Dhanda | G11B 5/746 360/48 |

* cited by examiner

*Primary Examiner* — Ali Neyzari (57) ABSTRACT

The embodiments disclose a method including creating at least one first structure including magnetically isolated features in servo fields, and creating at least one second structure including finger-structure patterns including intentional weak nucleation points in servo fields to create a regular bi-polar magnetization direction after bulk DC initialization, and wherein the first and second structures form bi-polar complementary structure patterns.

20 Claims, 8 Drawing Sheets

METHOD FOR PRODUCING BI-POLAR COMPLEMENTARY STRUCTURE PATTERNS

CROSS-REFERENCE TO RELATED APPLICATIONS

This application is based on U.S. Provisional Patent Application Ser. No. 61/778,334 filed Mar. 12, 2013, entitled "A Method of Magnetization Polarity Indifferent Servo Demodulation for Patterned Media", by First Named Inventor René van de Veerdonk, et al.

DETAILED DESCRIPTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of a method for producing bi-polar complementary structure patterns is described for illustrative purposes and the underlying system can apply to any number and multiple types of servo structures and configurations. In one embodiment the servo structures can be configured using a bit-patterned media design. The servo structures can be configured to include finger structures and can be configured to include radial direction chevron patterns using the embodiments.

A method for producing bi-polar complementary structure patterns includes two or more structures. The combined effect of one embodiment of the multiple structures is to produce an interlaced finger pattern on the disk that guarantees a regular bi-polar magnetization direction after bulk DC initialization.

For the first structure, portions of the servo-fields are created using direct-write e-beam recording using large, but magnetically isolated features, e.g., lines in the radial direction or chevron patterns in the position-error-signal fields.

The second structure complementary portions of the servo fields are created with features magnetically connected to nucleation points. The combined structures generate a regular, bi-polar servo signal. Bi-polar signals double the total servo signal amplitude and avoid base-line compensation. The method for producing bi-polar complementary structure patterns generates the bi-polar field while avoiding the cost to write these explicitly during in-drive initialization. The method for producing bi-polar complementary structure patterns creates finger structures with intentional weak nucleation points for one of the structures which will make up one of the two polarities, the other structures will not have weak nucleation points and will have the opposite magnetic polarity, the preferred magnetic pattern can be created using bulk dc initialization.

The finger structures can span as little as one e-beam field (approx. 10 micrometer) to as much as one logical radial zone (approx. 1 mm in the current design), with a trade-off between enhanced robustness and reduced loss to overhead by the use of more or less potentially unusable down-track finger-connectors and nucleation points. The weak nucleation points initiate reversal when the DC-field is removed due to dipolar interaction with its surroundings. The weak nucleation point then quickly grows by unobstructed domain-wall motion to encompass the fully connected finger-structure. After this initialization stage, the servo-fields have no net moment and are therefore thermally stable of one embodiment.

Figure 1:
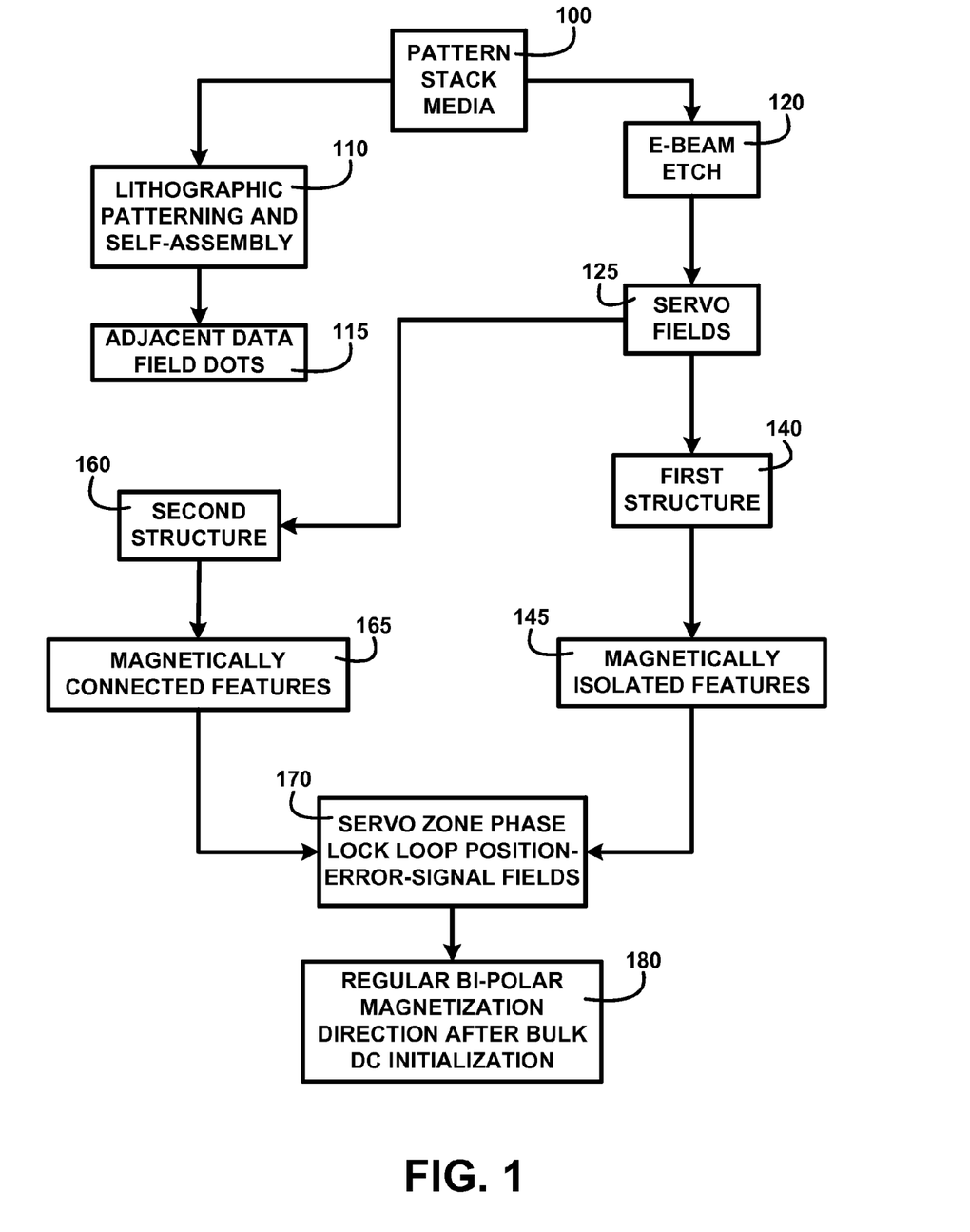
FIG. 1 shows a block diagram of an overview of a method for producing bi-polar complementary structure patterns of one embodiment.

FIG. 1 shows a block diagram of an overview of a method for producing bi-polar complementary structure patterns of one embodiment. FIG. 1 shows a pattern stack media 100 where lithographic patterning and self-assembly 110 is used to fabricate adjacent data field dots 115. An e-beam etch 120 is used to fabricate servo fields 125. A first structure 140 includes magnetically isolated features 145 to create servo zone phase lock loop position-error-signal fields 170. A second structure 160 of magnetically connected features 165 is configured to interlace with the first structure in the phase lock loop, gray code and position-error-signal fields to enable regular bi-polar magnetization direction servo field after bulk dc initialization 180 of one embodiment.

Detailed Description

Figure 2:
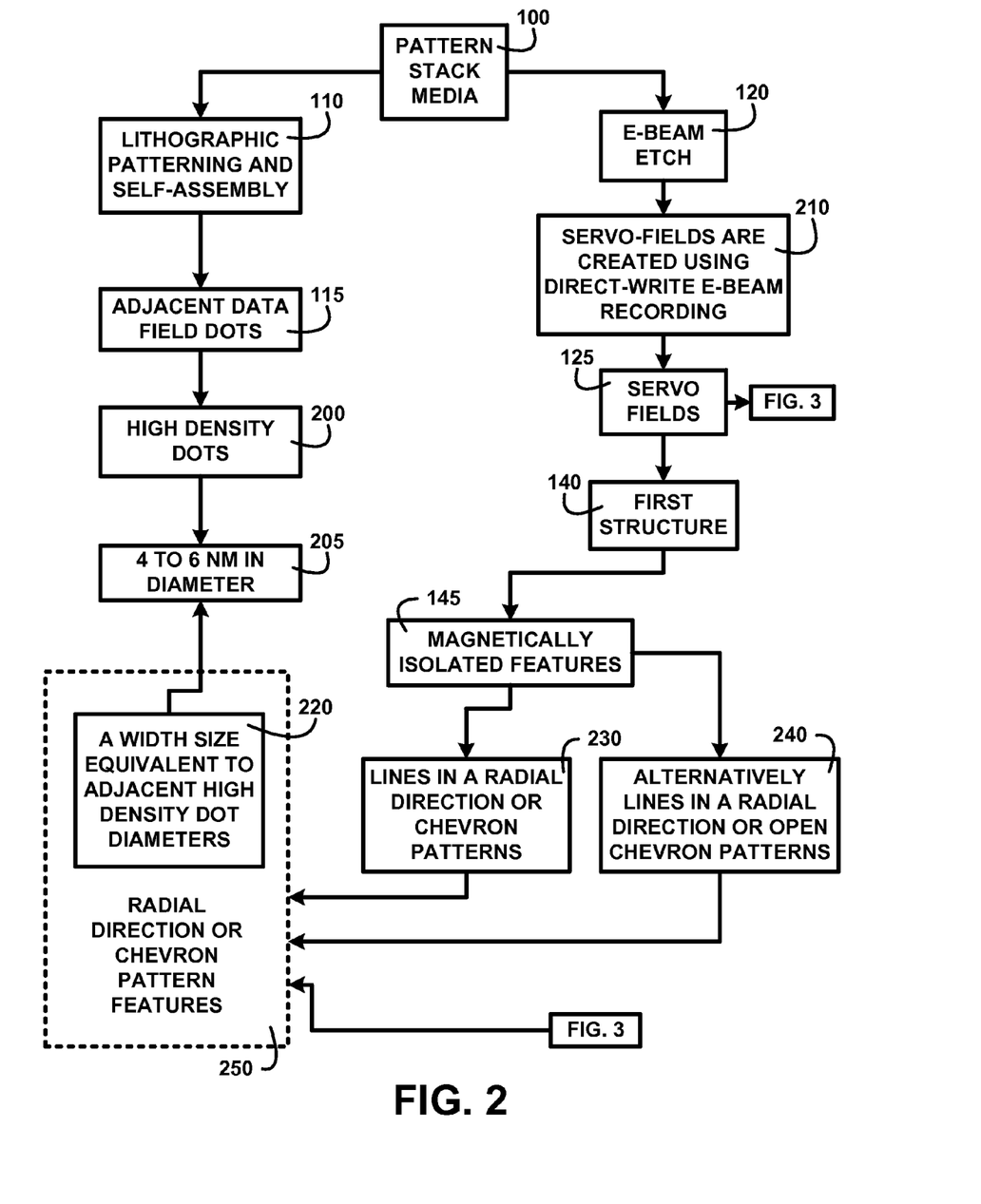
FIG. 2 shows a block diagram of an overview flow chart of first structure of one embodiment.

FIG. 2 shows a block diagram of an overview flow chart of first structure of one embodiment. FIG. 2 shows a pattern stack media 200 where lithographic patterning and self-assembly 210 is used to fabricate the adjacent data field dots 115. The adjacent data field dots 115 can include high density dots 200 including dots that are 4 to 6 nm in diameter 205. The e-beam etch 120 is used where servo-fields are created using direct-write e-beam recording 210 to create features within the servo fields 125. One embodiment of those features is described further in FIG. 3.

The first structure 140 including the magnetically isolated features 145 includes lines in a radial direction or chevron patterns 230 and alternatively lines in a radial direction or open chevron patterns 240. Radial lines or chevron pattern features 250 are configured to align, in the radial direction, to the position of adjacent high density data field dot 220.

Figure 3:
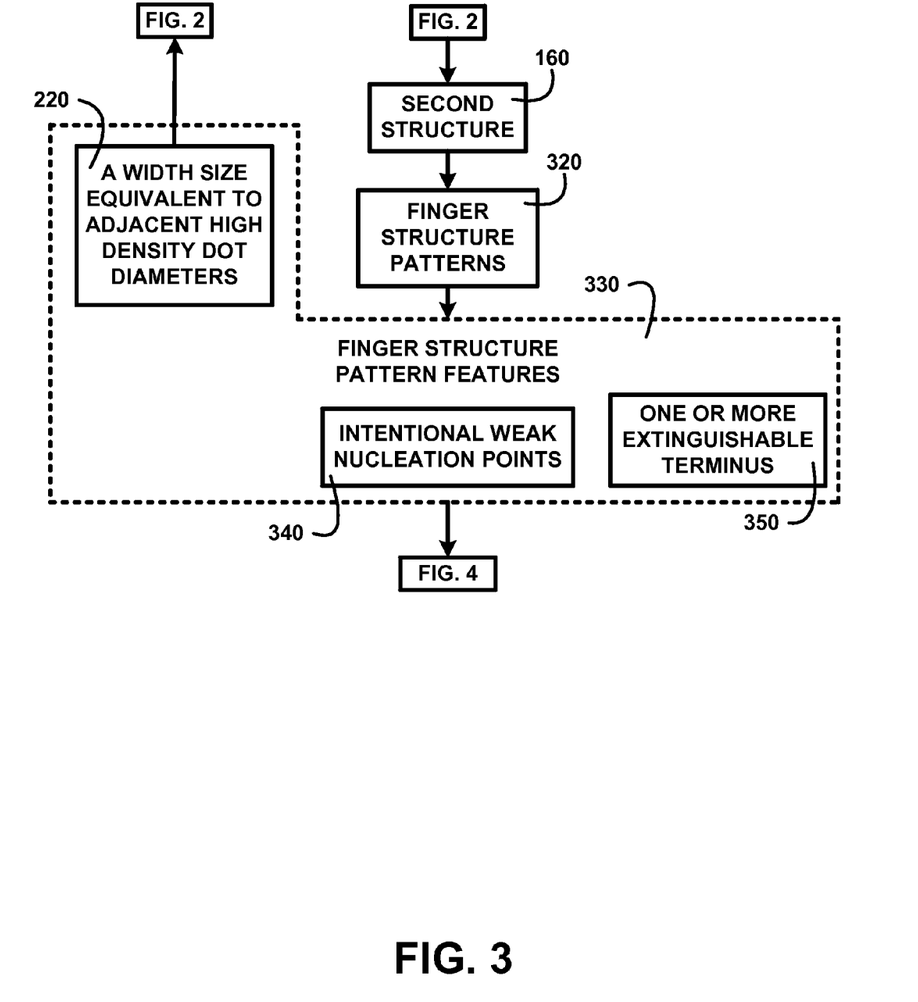
FIG. 3 shows for illustrative purposes only an example of second structure of one embodiment.

FIG. 3 shows for illustrative purposes only an example of second structure of one embodiment. FIG. 3 shows a continuation from FIG. 2 that includes the second structure 160. The second structure 160 includes finger structure patterns 320.

Finger structure pattern features 330 include one or more extinguishable terminus 350, intentional weak nucleation points 340. Descriptions of the method continue in FIG. 4 of one embodiment.

Figure 4:
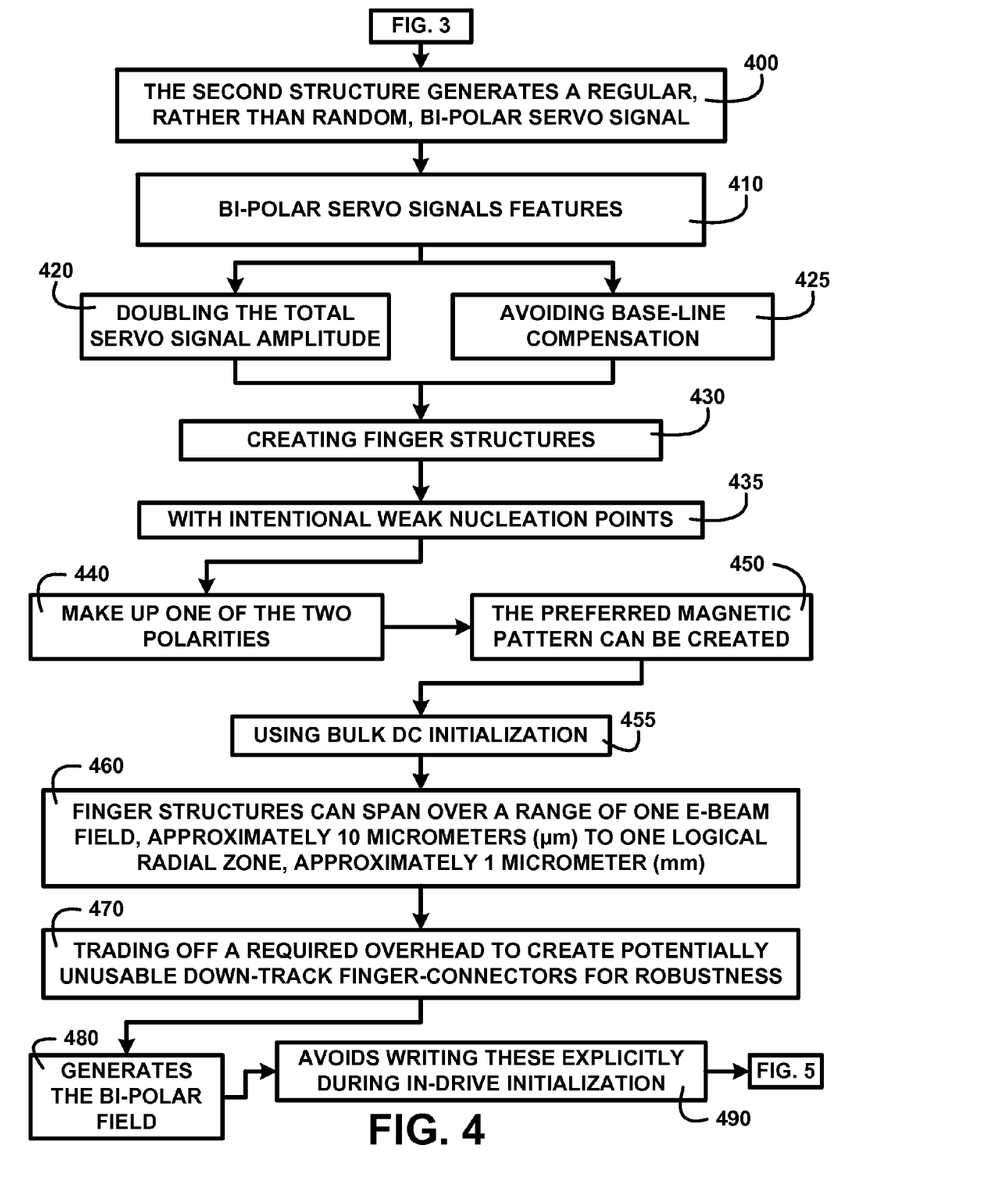
FIG. 4 shows for illustrative purposes only an example of regular bi-polar servo signal of one embodiment.

FIG. 4 shows for illustrative purposes only an example of regular bi-polar servo signal of one embodiment. FIG. 4 shows continuing from FIG. 3 where the combined first and second structures generates a regular, rather than random, bi-polar servo signal 400. Bi-polar servo signals features 410 include doubling the total servo signal amplitude 420 and avoiding base-line shift and base-line compensation 425. Creating finger structures 430 with intentional weak nucleation points 435 make up one of the two polarities 440. The finger structures 430 with intentional weak nucleation points 435 enables bi-polarity wherein the magnetic pattern can be created 450 using bulk dc initialization 455 of one embodiment.

Finger structures can span over a range of one e-beam field, approximately 10 micrometers (μm) to one logical radial zone, approximately 1 micrometer (mm) 460 trading off an overhead to create potentially unusable down-track finger-connectors for robustness 470. The finger structures 430 with intentional weak nucleation points 435 generates the bi-polar field 480 which avoids writing these explicitly during in-drive initialization 490. The descriptions of the method continue in FIG. 5 of one embodiment.

Figure 5:
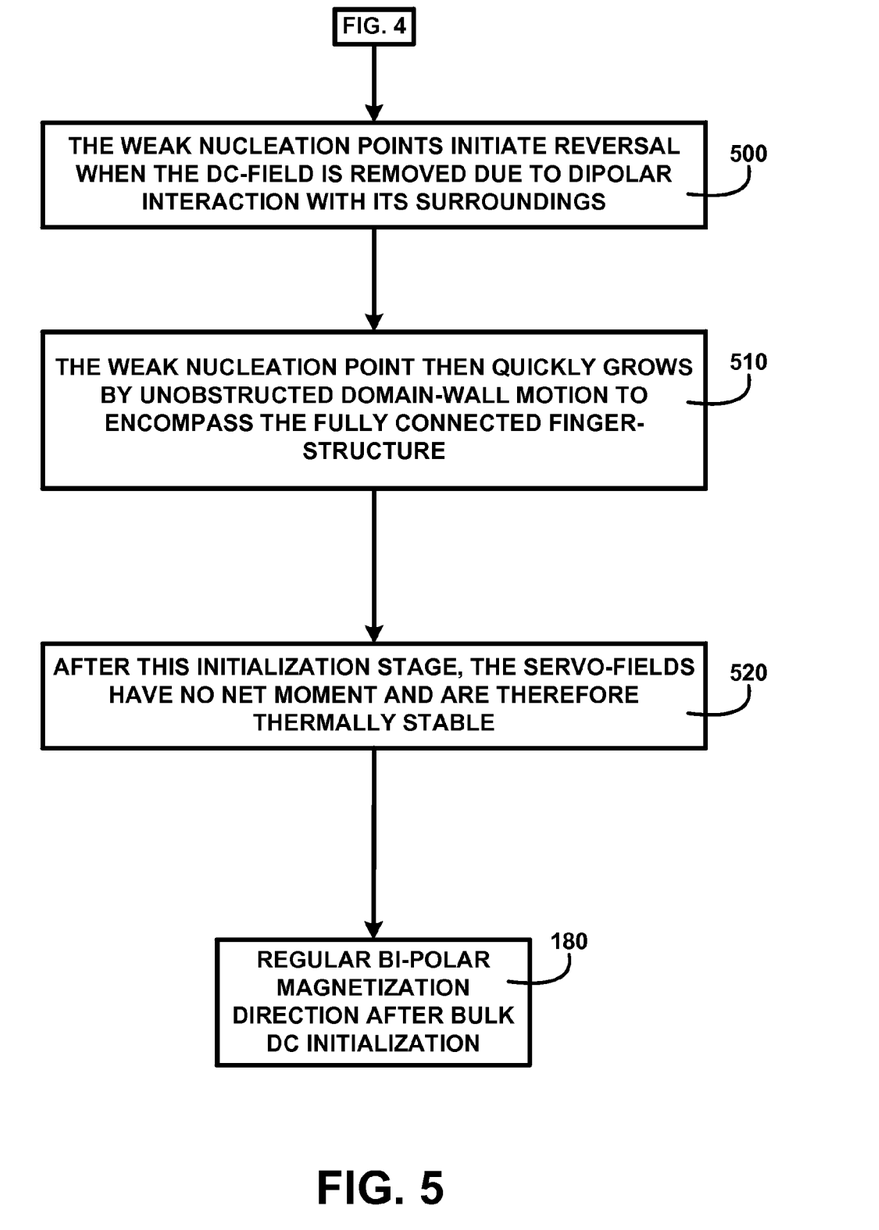
FIG. 5 shows for illustrative purposes only an example of weak nucleation points of one embodiment.

FIG. 5 shows for illustrative purposes only an example of weak nucleation points of one embodiment. FIG. 5 shows a continuation from FIG. 4 and includes wherein the weak nucleation points initiate reversal when the DC-field is removed due to dipolar interaction with its surroundings 500. The weak nucleation point then quickly grows by unobstructed domain-wall motion to encompass the fully connected finger-structure 510. After this initialization stage, the servo-fields have no net moment and are therefore thermally stable 520. The finger structure patterns 320 of FIG. 3 with their weak nucleation points enable regular bi-polar magnetization direction after bulk dc initialization 180 of one embodiment.

Figure 6:
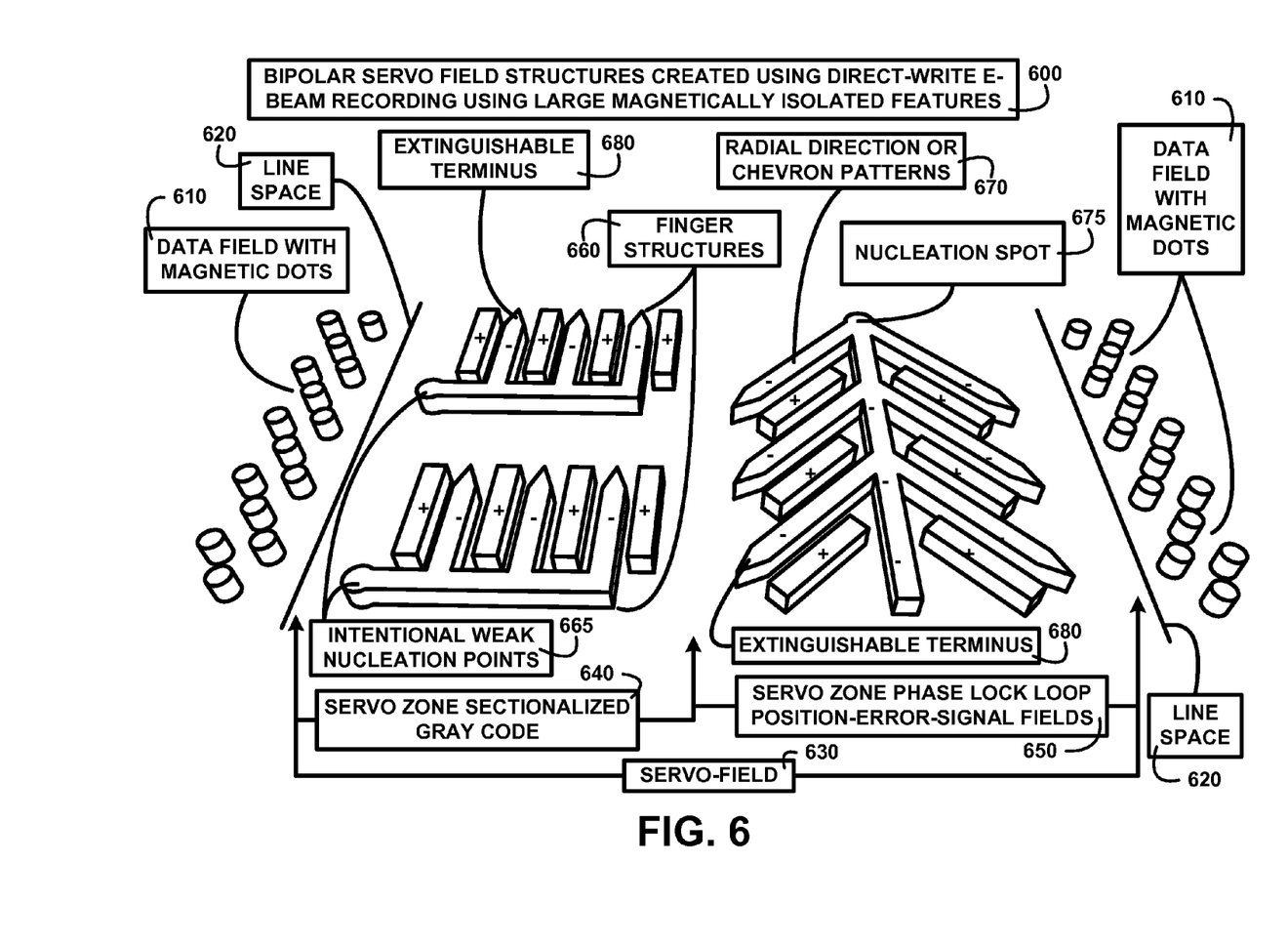
FIG. 6 shows for illustrative purposes only an example of bipolar servo field structures of one embodiment.

FIG. 6 shows for illustrative purposes only an example of bipolar servo field structures of one embodiment. FIG. 6 shows bipolar servo field structures created using direct-write e-beam recording using large magnetically isolated features 600. The large magnetically isolated features are fabricated in the servo-field 630 adjacent to data field with magnetic dots 610 and separated by a line space 620. In one embodiment some of the servo-field 630 features including finger structures 660 can be configured to create servo zone sectionalized gray code 640. In another embodiment some of the servo-field 630 features including radial direction or chevron patterns 670 can be configured to create servo zone phase lock loop position-error-signal fields 650. The finger structures 660 are configured to include intentional weak nucleation points 665 and extinguishable terminus 680. The radial direction or chevron patterns 670 are configured to include a nucleation spot 675 and extinguishable terminus 680 of one embodiment.

Figure 7A:
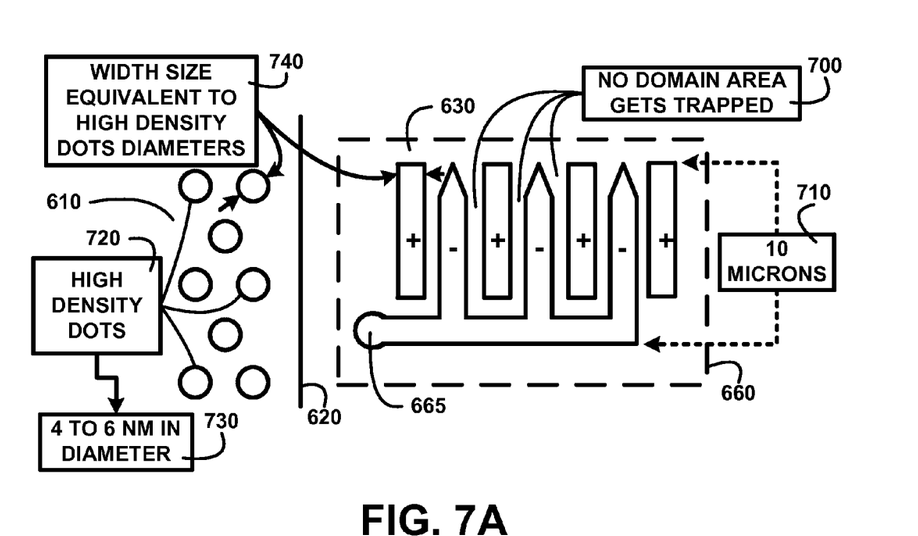
FIG. 7A shows for illustrative purposes only an example of finger structures of one embodiment.

FIG. 7A shows for illustrative purposes only an example of finger structures of one embodiment. FIG. 7A shows the data field with magnetic dots 610. The data field with magnetic dots 610 can include high density dots 720 with 4 to 6 nm in diameter 730. The data field with magnetic dots 610 is separated by the line space 620 from the servo-field 630. In the servo-field 630 are the finger structures 660 including intentional weak nucleation points 665. The finger structures 660 are configured wherein no domain area gets trapped 700. The overall extension of the fingers can be configured to be 10 microns 710. The finger structures 660 are configured to have a width size equivalent to high density dots diameters 740. The finger structures 660 can be configured using other structural configurations 740 of one embodiment.

Figure 7B:
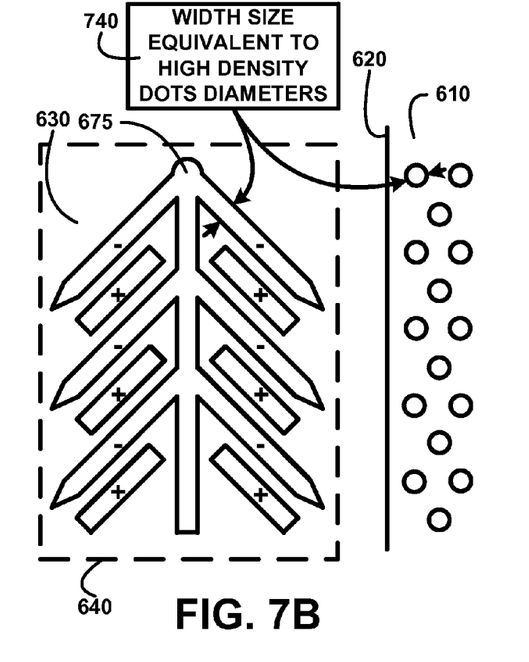
FIG. 7B shows for illustrative purposes only an example of radial direction or chevron patterns of one embodiment.

FIG. 7B shows for illustrative purposes only an example of radial direction or chevron patterns of one embodiment. FIG. 7B shows the data field with magnetic dots 610 separated from the servo-field 630 by the line space 620. The servo-field 630 includes the radial direction or chevron patterns 670 including the nucleation spot 675. The structure of the radial direction or chevron patterns 670 has a width size equivalent to high density dots diameters 740 of one embodiment.

Figure 7C:
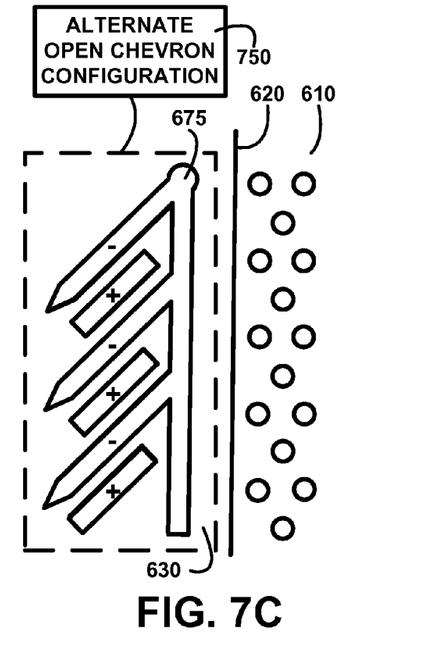
FIG. 7C shows for illustrative purposes only an example of alternate open chevron configuration of one embodiment.

FIG. 7C shows for illustrative purposes only an example of an alternate open chevron configuration of one embodiment. FIG. 7C shows the data field with magnetic dots 610 separated by the line space 620 and adjacent to the servo-field 630. The nucleation spot 675 is configured on an alternate open chevron configuration 750 which includes the other radial direction or chevron pattern features 250 of FIG. 2 of one embodiment.

Figure 8A:
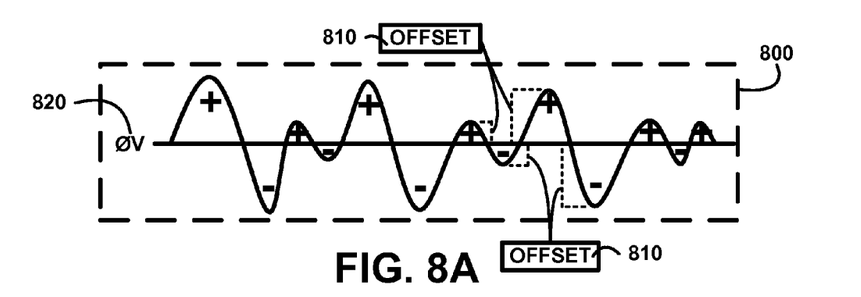
FIG. 8A shows for illustrative purposes only an example of random servo signal waveform of one embodiment.

FIG. 8A shows for illustrative purposes only an example of random servo signal waveform of one embodiment. FIG. 8A shows a random servo signal waveform generated by reverse field nucleation 800 where an amplitude offset 810 from a phase and voltage (ØV) amplitude baseline 820 varies randomly due to uncontrolled nucleation reversals. Controlling randomly magnetized servo-fields 155 of FIG. 1 prevent read errors. Random magnetization directions can be introduced over time as a result of an array of unspecified events of one embodiment.

Figure 8B:
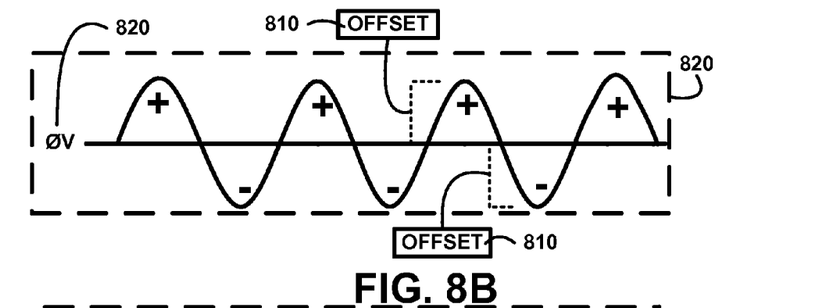
FIG. 8B shows for illustrative purposes only an example of regular bi-polar servo signal waveform of one embodiment.

FIG. 8B shows for illustrative purposes only an example of regular bi-polar servo signal waveform of one embodiment. FIG. 8B shows a regular bi-polar servo signal waveform generated 830 by the finger structures 660 of FIG. 6. The regularity of the amplitude offset 810 from a phase and voltage (øv) amplitude baseline 820 is that which is generated by the finger structures 660 of FIG. 6. The regular bi-polar servo signal waveform produces doubling of the total servo signal amplitude of one embodiment.

Figure 8C:
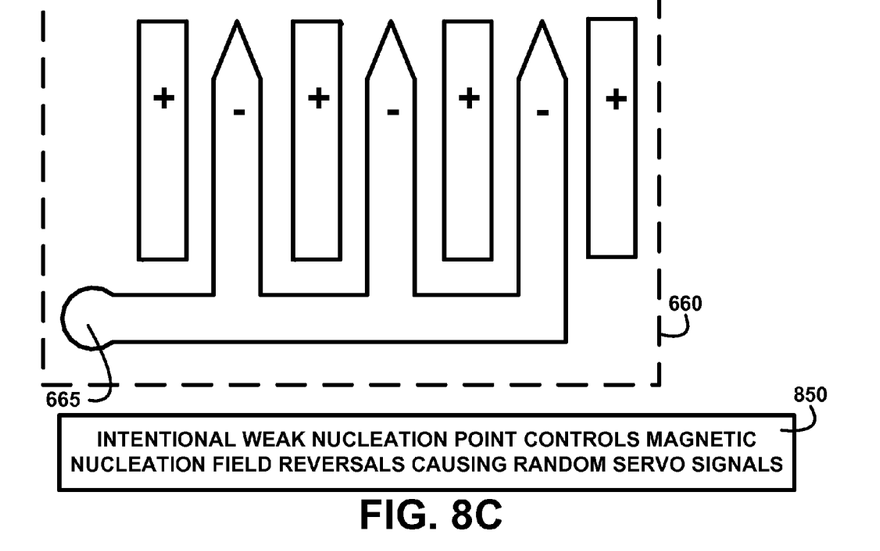
FIG. 8C shows for illustrative purposes only an example of a bi-polar complementary structure of one embodiment.

FIG. 8C shows for illustrative purposes only an example of a bi-polar complementary structure of one embodiment. FIG. 8C shows the finger structures 660 including the intentional weak nucleation points 665. The intentional weak nucleation points controls magnetic nucleation field reversals causing random servo signals 850 of one embodiment. Polarity in structure features including the finger structures 660 and including the intentional weak nucleation points 665 control the random switching of polarity of the servo signals. The intentional weak nucleation points generate a regular, rather than random, bi-polar servo signal. Bi-polar signals have features including doubling the total servo signal amplitude. The method for producing bi-polar complementary structure patterns generates the bi-polar field and avoids costly writing the bi-polar fields explicitly during in-drive initialization.

The foregoing has described the principles, embodiments and modes of operation. However, the invention should not be construed as being limited to the particular embodiments discussed. The above described embodiments should be regarded as illustrative rather than restrictive, and it should be appreciated that variations may be made in those embodiments by workers skilled in the art without departing from the scope as defined by the following claims.

What is claimed is:

1. A method, comprising:
    creating at least one first structure including magnetically isolated features in servo fields; and creating at least one second structure including finger-structure patterns including intentional weak nucleation points in servo fields to create a regular bi-polar magnetization direction after bulk DC initialization, and wherein the first and second structures form bi-polar complementary structure patterns.

2. The method of claim 1, further comprising radial direction chevron patterns and alternatively open chevron patterns e-beam etched into the magnetically isolated features including a width size equivalent to adjacent high density dot diameters.

3. The method of claim 1, wherein the structures in servo fields form servo zone phase lock loop or position-error-signal fields to create bi-polar signals.

4. The method of claim 1, wherein the magnetically isolated features include patterns with one or more extinguishable terminus.

5. The method of claim 1, wherein the first structure is used for controlling deterministically magnetized servo-fields.

6. The method of claim 1, wherein the first structure includes magnetically isolated feature structures including the radial direction chevron patterns and in another embodiment open chevron patterns in servo fields.

7. The method of claim 1, wherein the second structure includes finger-structure patterns etched into servo fields including using an e-beam etch process wherein second structures include a width size equivalent to adjacent high density dot diameters.

8. The method of claim 1, wherein the combined first and second structure creates servo zone phase lock loop position-error-signal fields.

9. The method of claim 1, wherein the second structure includes finger-structure patterns wherein finger structures can span in a range from one e-beam field, approximately 10 micrometers (μm), to one logical radial zone, approximately 1 millimeter (mm).

10. The method of claim 1, wherein the second structure includes polarity in the structure finger-structure patterns.

11. A structure, comprising:
   at least one magnetically isolated feature in servo fields;
   a polarity in the magnetically isolated feature; and
   a servo structure including at least one polarity magnetically isolated feature configured to create servo zone phase lock loop and position-error-signal fields configured to create randomized bi-polar signals.

12. The structure of claim 11, wherein the magnetically isolated feature includes a width size equivalent to adjacent high density dot diameters.

13. The structure of claim 11, wherein the magnetically isolated features are configured to include nucleation spots in servo fields to form servo zone phase lock loop and position-error-signal fields to create bi-polar signals.

14. The first structure of claim 11, wherein the structure is configured for use in controlling randomly magnetized servo-fields.

15. The first structure of claim 11, wherein the magnetically isolated feature is configured to include radial direction chevron patterns and in another embodiment open chevron patterns including a nucleation spot and at least one extinguishable terminus.

16. A structure, comprising:
   at least one structure configured to include at least one finger-structure pattern in servo fields;
   a polarity in the finger-structure pattern of the structure; and
   at least one intentional weak nucleation point in the finger-structure pattern configured to achieve a regular bi-polar magnetization direction after bulk DC initialization.

17. The structure of claim 16, wherein the finger-structure can span in a range from one e-beam field, approximately 10 micrometers (μm), to one logical radial zone, approximately 1 millimeter (mm).

18. The structure of claim 16, wherein the finger-structure pattern includes at least one extinguishable terminus.

19. The structure of claim 16, wherein the structure is configured for use in controlling randomly magnetized servo-fields.

20. The structure of claim 16, wherein the finger-structure pattern includes a width size equivalent to adjacent high density dot diameters.

* * * * *